(12) United States Patent
Cudak et al.

(10) Patent No.: US 9,292,486 B2
(45) Date of Patent: Mar. 22, 2016

(54) VALIDATION OF FORMULAS WITH EXTERNAL SOURCES

(71) Applicant: INTERNATIONAL BUSINESS MACHINES CORPORATION, Armonk, NY (US)

(72) Inventors: Gary D. Cudak, Creedmoor, NC (US); Christopher J. Hardee, Raleigh, NC (US); Adrian X. Rodriguez, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 14/150,251

(22) Filed: Jan. 8, 2014

(65) Prior Publication Data

US 2015/0193422 A1 Jul. 9, 2015

(51) Int. Cl.
*G06F 17/00* (2006.01)
*G06F 17/24* (2006.01)
*G06F 11/36* (2006.01)

(52) U.S. Cl.
CPC ............ *G06F 17/246* (2013.01); *G06F 11/362* (2013.01)

(58) Field of Classification Search
CPC ...................................................... G06F 17/246
See application file for complete search history.

(56) References Cited

U.S. PATENT DOCUMENTS

| | | | | | |
|---|---|---|---|---|---|
| 5,276,607 | A | * | 1/1994 | Harris et al. .................. | 345/467 |
| 5,371,675 | A | * | 12/1994 | Greif et al. ..................... | 715/220 |
| 5,600,584 | A | * | 2/1997 | Schlafly ........................ | 708/551 |
| 5,603,021 | A | * | 2/1997 | Spencer ................ | G06F 17/246 |
| 5,842,180 | A | * | 11/1998 | Khanna et al. .................. | 705/30 |
| 6,185,582 | B1 | * | 2/2001 | Zellweger ............. | G06F 17/246 715/212 |
| 6,192,379 | B1 | * | 2/2001 | Bekenn ......................... | 715/206 |
| 6,256,649 | B1 | * | 7/2001 | Mackinlay ............ | G06F 17/246 345/473 |
| 7,099,890 | B2 | * | 8/2006 | Cahill et al. | |
| 7,117,430 | B2 | * | 10/2006 | Maguire et al. ................ | 715/212 |
| 7,350,141 | B2 | * | 3/2008 | Kotler et al. ................... | 715/209 |
| 7,546,521 | B2 | * | 6/2009 | Bedford et al. ................ | 715/212 |
| 8,145,990 | B2 | * | 3/2012 | Le Brazidec et al. ......... | 715/220 |
| 2002/0087593 | A1 | * | 7/2002 | Rank .................... | G06F 9/44521 715/230 |
| 2004/0128623 | A1 | * | 7/2004 | Hudson .................. | G06Q 10/10 715/256 |
| 2004/0205524 | A1 | * | 10/2004 | Richter ................. | G06F 17/246 715/213 |
| 2005/0097464 | A1 | * | 5/2005 | Graeber ................ | G06F 17/246 715/700 |
| 2006/0112123 | A1 | * | 5/2006 | Clark et al. .................... | 707/101 |
| 2006/0161844 | A1 | * | 7/2006 | Simkhay et al. .............. | 715/538 |
| 2006/0282818 | A1 | * | 12/2006 | DeSpain ........................ | 717/109 |
| 2007/0011211 | A1 | * | 1/2007 | Reeves et al. ................. | 707/203 |

(Continued)

OTHER PUBLICATIONS

S. Scaife, "No. 29—Formula Auditing", www.exceltricksandtips. com, 2008, pp. 1-3.

(Continued)

*Primary Examiner* — Laurie Ries
(74) *Attorney, Agent, or Firm* — Law Office of Jim Boice (57) ABSTRACT

A system and/or computer program product validates a formula within a spreadsheet. A formula type, of an identified formula from a spreadsheet, is identified. A database of known accurate formulas, whose type matches a formula type of the identified formula within the spreadsheet, is identified and located. A determination is made as to whether the identified formula from the spreadsheet matches a known accurate formula from the database. In response to the identified formula from the spreadsheet failing to match the known accurate formula from the database, a predefined action is initiated.

8 Claims, 3 Drawing Sheets

200

| KNOWN TYPE 201 | INITIALLY UNKNOWN TYPE 203 |
|---|---|
| FORMULA 202a | FORMULA 204a (DERIVED FROM FORMULA 202a, AND THUS IS OF KNOWN TYPE 201) |
| FORMULA 202b | FORMULA (DETERMINED TO BE OF KNOWN TYPE 302) 204b |
| FORMULA 202n | FORMULA (DETERMINED TO BE OF KNOWN TYPE 305) 204n |

(56) References Cited

U.S. PATENT DOCUMENTS

| | | | |
|---|---|---|---|
| 2007/0022128 A1* | 1/2007 | Rothschiller et al. | 707/100 |
| 2007/0136666 A1* | 6/2007 | Khen et al. | 715/538 |
| 2008/0168341 A1* | 7/2008 | Payette | 715/212 |
| 2009/0150426 A1* | 6/2009 | Cannon et al. | 707/102 |
| 2010/0050074 A1* | 2/2010 | Nachmani et al. | 715/257 |
| 2010/0169758 A1* | 7/2010 | Thomsen | 715/212 |
| 2010/0180220 A1* | 7/2010 | Becerra, Jr. | G06F 3/0481 715/763 |
| 2011/0106567 A1* | 5/2011 | Asher | 705/4 |
| 2012/0042242 A1* | 2/2012 | Garland | G06F 17/215 715/256 |
| 2012/0216103 A1* | 8/2012 | Campbell et al. | 715/212 |
| 2013/0132927 A1* | 5/2013 | Kraft et al. | 717/106 |
| 2013/0159832 A1* | 6/2013 | Ingargiola et al. | 715/220 |

OTHER PUBLICATIONS

Anonymous, "Formula Bar Enhancement for Spreadsheets", IP.com, IPCOM000212336D, November 7, 2011, pp. 1-3.

J. Mitchell, "Google Docs Remembers Spreadsheet Formulas So You Don't Have to", Say Media Inc., Readwrite, Readwrite.com, Aug. 11, 2011, pp. 1-2.

Anonymous, "More Information About XLAnalyst Standard", Codematic Ltd., 2008, pp. 1-2.

* cited by examiner

| KNOWN TYPE 201 | INITIALLY UNKNOWN TYPE 203 |
|---|---|
| FORMULA 202a | FORMULA 204a (DERIVED FROM FORMULA 202a, AND THUS IS OF KNOWN TYPE 201) |
| FORMULA 202b | FORMULA 204b (DETERMINED TO BE OF KNOWN TYPE 302) |
| FORMULA 202n | FORMULA 204n (DETERMINED TO BE OF KNOWN TYPE 305) |

| KNOWN TYPE 201 | FORMULA 202a | FORMULA 202a | FORMULA 204a | FORMULA 306 |
|---|---|---|---|---|
| KNOWN TYPE 302 | FORMULA 308 | | 310 | FORMULA 204b |
| KNOWN TYPE 305 | FORMULA 312 | | 314 | FORMULA 316 |

FORMULA 202a
FORMULA 202b
FORMULA 204a
FORMULA 204b
FORMULA 204n

FIG. 4

VALIDATION OF FORMULAS WITH EXTERNAL SOURCES

BACKGROUND

The present disclosure relates to the field of computers, and specifically to the use of computers that execute formulas in spreadsheets. Still more particularly, the present disclosure relates to validating the accuracy of formulas from spreadsheets.

A spreadsheet is made up of rows and columns of cells. Spreadsheets often utilize formulas within one or more of the cells. The formulas may be independent, in which they require nothing more than a call to input data, or they may be dependent, in which they require operands and/or output results from one or more formulas found in other cells. Formulas are often syntax-dependent. For example, consider the correct formula for converting a temperature from Fahrenheit into Celsius:

$$(°F.-32) \times 5/9 = °C.$$

Now consider the following formula, which (due to the absence of requisite parentheses) is incorrect, even though it appears very similar to $(°F.-32) \times 5/9 = °C.$:

$$°F.-32 \times 5/9 = °C.$$

Although a computer will still be able to execute the formula $°F.-32 \times 5/9 = °C.$, when executed $°F.-32 \times 5/9 = °C.$ will return an incorrect answer. Such syntax mistakes, unfortunately, are common, particularly where no execution error results (i.e., the formula is still executable, even though it is incorrect).

SUMMARY

A system and/or computer program product validates a formula within a spreadsheet. A formula type, of an identified formula from a spreadsheet, is identified. A database of known accurate formulas, whose type matches a formula type of the identified formula within the spreadsheet, is identified and located. A determination is made as to whether the identified formula from the spreadsheet matches a known accurate formula from the database. In response to the identified formula from the spreadsheet failing to match the known accurate formula from the database, a predefined action is initiated.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
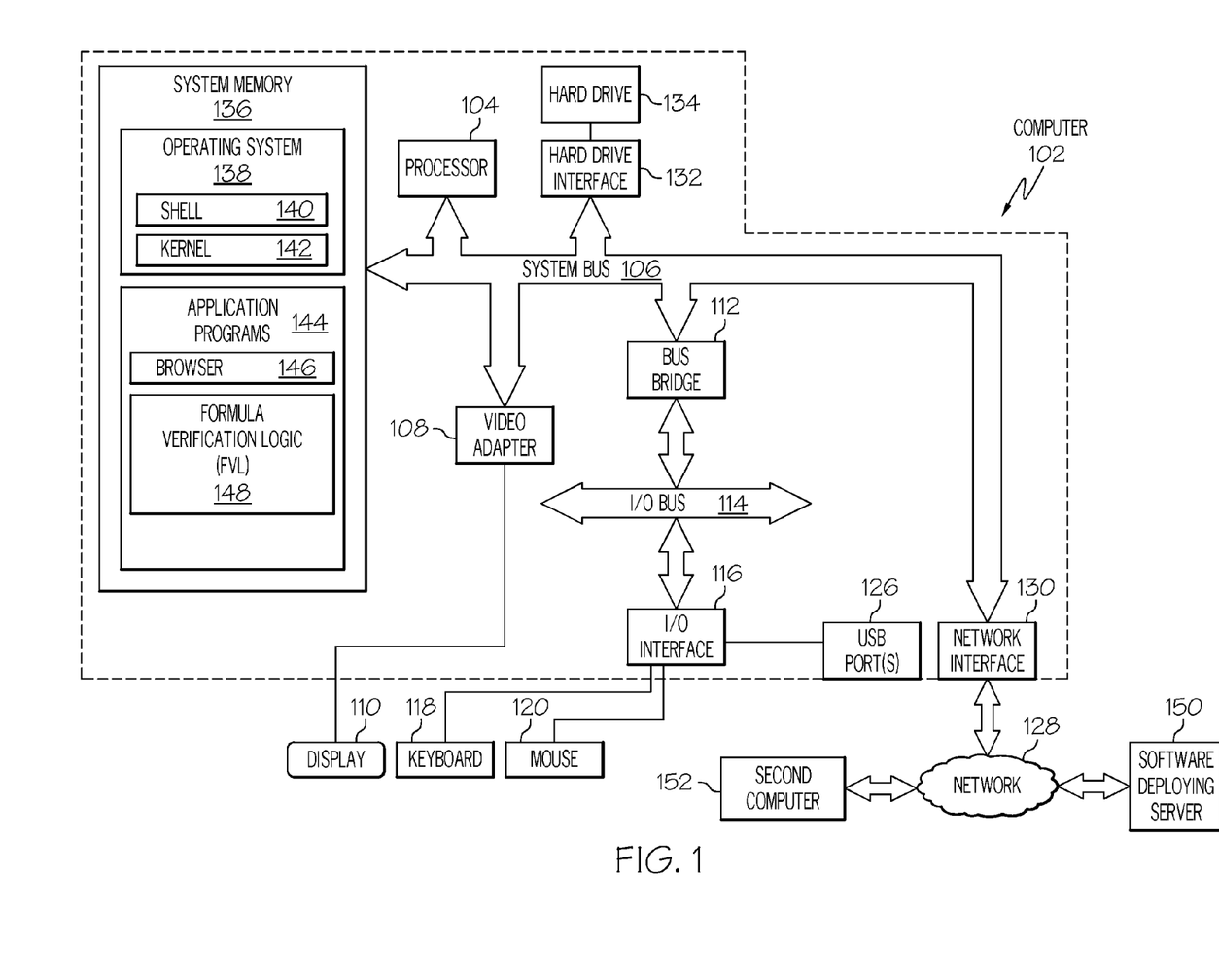
FIG. 1 depicts an exemplary system and network which may be used to implement the present invention.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or a second computer 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems such as second computer 152.

Application programs 144 in computer 102's system memory (as well as software deploying server 150's system memory) also include a Formula Verification Logic (FVL) 148. FVL 148 includes code for implementing the processes described below, including those described in FIGS. 2-4. In one embodiment, computer 102 is able to download FVL 148 from software deploying server 150, including in an on-demand basis, wherein the code in FVL 148 is not downloaded until needed for execution. Note further that, in one embodiment of the present invention, software deploying server 150 performs all of the functions associated with the present invention (including execution of FVL 148), thus freeing computer 102 from having to use its own internal computing resources to execute FVL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
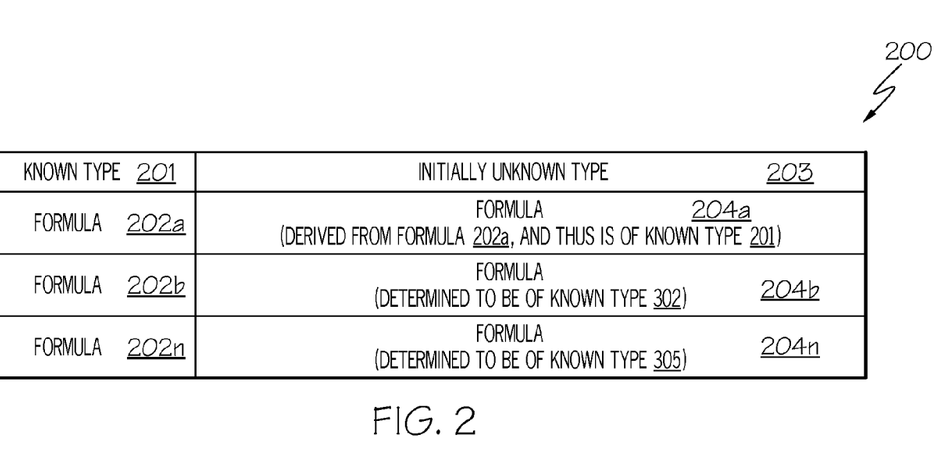
FIG. 2 illustrates a spreadsheet containing formulas of both known types and initially unknown types.

With reference now to FIG. 2, exemplary spreadsheet 200 contains cells that hold two types of formulas: known and initially unknown. For example, consider formulas 202a-202n (where "n" is an integer). The heading 201 contains information that describes what type of formulas these are, such as "temperature conversion formulas", "amortization formulas", "actuarial formulas", "scientific research formulas", etc. Thus, if the known type heading 201 contains the label "amortization formulas", then formulas 202a-202n are all formulas used to calculate payment, balance, and/or equity information about a loan. Similarly, if heading 201 includes a particular keyword or phrase, such as "home loan", then there is an implicit understanding that formulas 202a-202n are amortization formulas.

However, formulas 204a-204n (where "n" is an integer) are initially of an unknown type, as suggested by the column descriptor "initially unknown type" for heading 203. That is, there is not a column/row heading that identifies the nature (i.e., type) of formulas 204a-204n. However, these initially unknown types of formulas under heading 203 can be ascertained in various ways, according to one or more embodiments of the present invention.

For example, consider exemplary formula 204a. Assume for exemplary purposes that formula 204a is "A+B=C". Assume further that formula 202a is "X−Y=B". As such, there is a link (element "B") between formula 204a and formula 202a. Since formula 202a is a known type of formula (as indicated by its position in the column under header 201 for known types of formulas), then an assumption can be made that formula 204a is of this same type. That is, assume for explanatory purposes that formula 204a calculates a mortgage payment schedule. Since the output of formula 202a (i.e., "B") is used as one of the variables in formula 204a, then an assumption can be made that formula 204a is also related to mortgage payment schedules, or at least to real estate, finance, etc.

Similarly, formula 204a may be derived from the structure of formula 202a. For example, assume that formula 202a is "X−Y=Z". Assume further that formula 204a is "3*(X−Y)=Z+20". Since a variation of "X−Y=Z" is found in formula 204a, then formula 204a is derived from formula 202a. Thus, a conclusion is reached that formula 204a is of the same type (as described by heading 201) as formula 202a.

Consider now exemplary formula 204b. Assume for exemplary purposes that formula 204b is initially of an unknown type, but its type can be determined according to the syntax and/or nomenclature used in formula 204b. For example, assume that formula 204b uses the term (i.e., "measurement unit") "millibar" (e.g., formula 204b is "X*1 millibar=X*100 Newtons". An assumption can be made that formula 204b is related to meteorology, since "millibar" is a term that is typically used only in weather research and forecasting. Similarly, if formula 204n uses the term "rads", then an assumption can be made that formula 204n relates to radiology. Other formula types for formulas 204a-204n can be inferred as being related to "finance" if the unit "$" is part of the formula, to "real estate" if the unit "acres" is part of the formula, etc.

Figure 3:
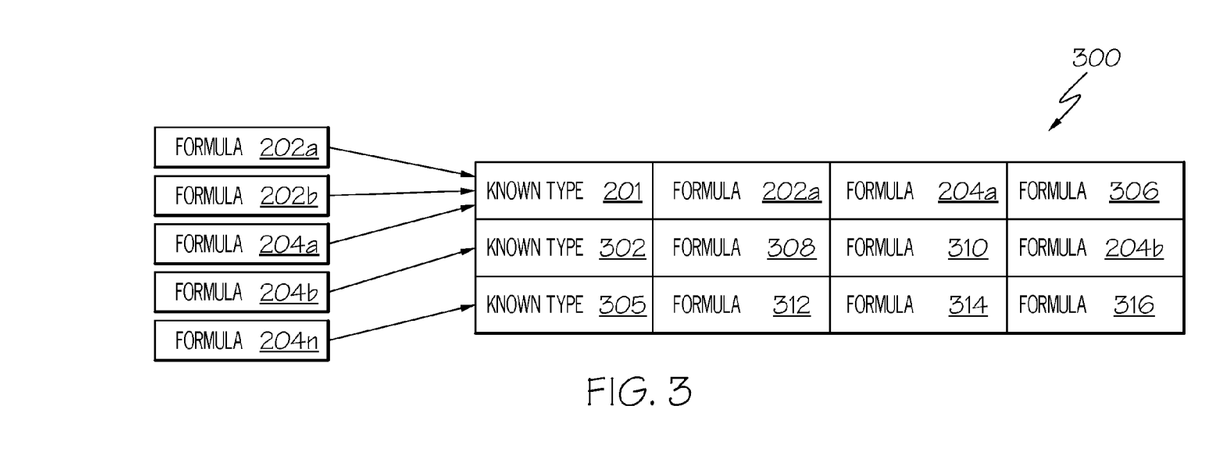
FIG. 3 depicts a process of matching formulas of known types to valid formulas, of the same types, from a database.

With reference now to FIG. 3, an overview of one or more embodiments of the present invention in which formulas of known types are matched to valid formulas, of the same types, from a database are presented. For example, consider database 300, which may be within, managed by, accessible through, etc. a computer such as second computer 152 shown in FIG. 1. That is, in one embodiment the spreadsheet 200 shown in FIG. 2 is serviced and managed by computer 102 in FIG. 1, while database 300 is accessed and/or serviced and/or managed by second computer 152 shown in FIG. 1.

Database 300, depicted in FIG. 3 in an explanatory and exemplary embodiment, may be a structured database (e.g., a relational database, a spreadsheet, an array of one or more dimensions, etc. of known formulas), or an unstructured database (e.g., data that is mined from webpages, publications, e-mail messages, etc.). In either embodiment, the formulas found in database 300 can be ranked according to a structured ranking (e.g., allow persons to "vote" on how useful, frequently used, trustworthy, accurate, etc. a particular formula is), or they can be ranked according to a ranking algorithm (e.g., determining how often a formula is found on the Internet, determining which industries use a particular formula, ranking the source of a particular formula, etc.).

For example, in a structured ranking, assume that a list of formulas used in real estate finance is presented to a select group of mortgage professionals. Assume further that more than one of these formulas can be used to calculate a mortgage schedule (i.e., payments, remaining debt, equity, etc.). Thus, these formulas can be ranked according to the scores given by the select group of mortgage professionals by voting through a website, etc.

As an example of ranking performed by a ranking algorithm, assume that there are two formulas for calculating a mortgage schedule. Assume further that the Internet is searched to locate instances of these two formulas being used. In one embodiment, the formula that is used the more frequently on the Internet is ranked higher than a less frequently used formula for calculating mortgage schedules, on the assumption that the more popular formula is the best. In one embodiment, the formula that is used more by mortgage lenders is deemed to rank highest. That is, a first formula that is more popular (i.e., is used by more people than the second formula) with the general public for calculating mortgage schedules might not be the favorite of experts in the field of mortgage banking Thus, the formula that is used by mortgage bankers (even if it is the second formula that is less popular with the general public) is ranked higher than the first formula.

With continued reference to FIG. 3, assume that all of the formulas shown in FIG. 2 have had their types identified, either according to their heading (e.g., formulas 202a-202n under heading 201) or according to an analysis of the formulas themselves (e.g., formulas 204a-204n). As discussed in the example above, formulas 202a, 202b, and 204a have all been determined to be of the type identified by heading 201. Pointers from formulas 202a, 202b, and 204a then point to the row in database 300 that also has the heading 201. Within this row are copies of formula 202a and 204a, thus indicating that formulas 202a and 204a are used by others, and thus are validated. That is, by virtue of the fact that formulas 202a and 204a are found in database 300 (under the heading 201), their use by others is apparent since they have either been manually inserted into database 300, or else formulas 202a and 204a have been located by data mining public resources such as the Internet, electronic publications, webpages, e-mails, etc.

However, formula 202b, although known to be of the type of formula described by heading 201, is not found in database 300 under this heading 201. This absence indicates an anomaly in formula 202b. For example, assume that formulas of the known type described by heading 201 (e.g., "real estate mortgages"), and in common usage, include formulas 202a, 204a, and 306, as shown database 300. However, formula 202b does not show up in database 300 (particularly under heading 201) as a formula that is used by others for calculating real estate mortgages. While there is a possibility that formula 202b presents a novel approach to this task (i.e., is a new and valid formula), the more likely reason for the anomaly is that there is a syntax error in formula 202b (e.g., parentheses are missing). Thus, an alert is issued (or some other type of action taken) in response to this anomaly.

Similarly, formula 204b (which in the example above was determined to be related to meteorology, and thus is of known type 302) is found in the appropriate row (having a heading for type 302) in database 300 (along with other formulas 308 and 310). Thus, formula 204b is validated. This validation can be weighted or unweighted. That is, an unweighted validation simply confirms that another party has used formula 204b. A weighted validation not only confirms that another party has used formula 204b, but also describes who used the formula 204b (e.g., an expert in the field that uses that type of formula), how often the formula 204b has been used by others, what the source of formula 204b is, etc.

Note that while formula 204n, which in the example above was determined to be of a type described in heading 305 (i.e., is used in radiology), none of the known formulas (312, 314, or 316) found in database 300 and related to radiology (i.e., the known type of formula described by heading 305) and used by others includes formula 204n. Thus, formula 204n is either 1) a brand new valid formula, or 2) is a bad formula (e.g., has a syntax error, etc.).

Figure 4:
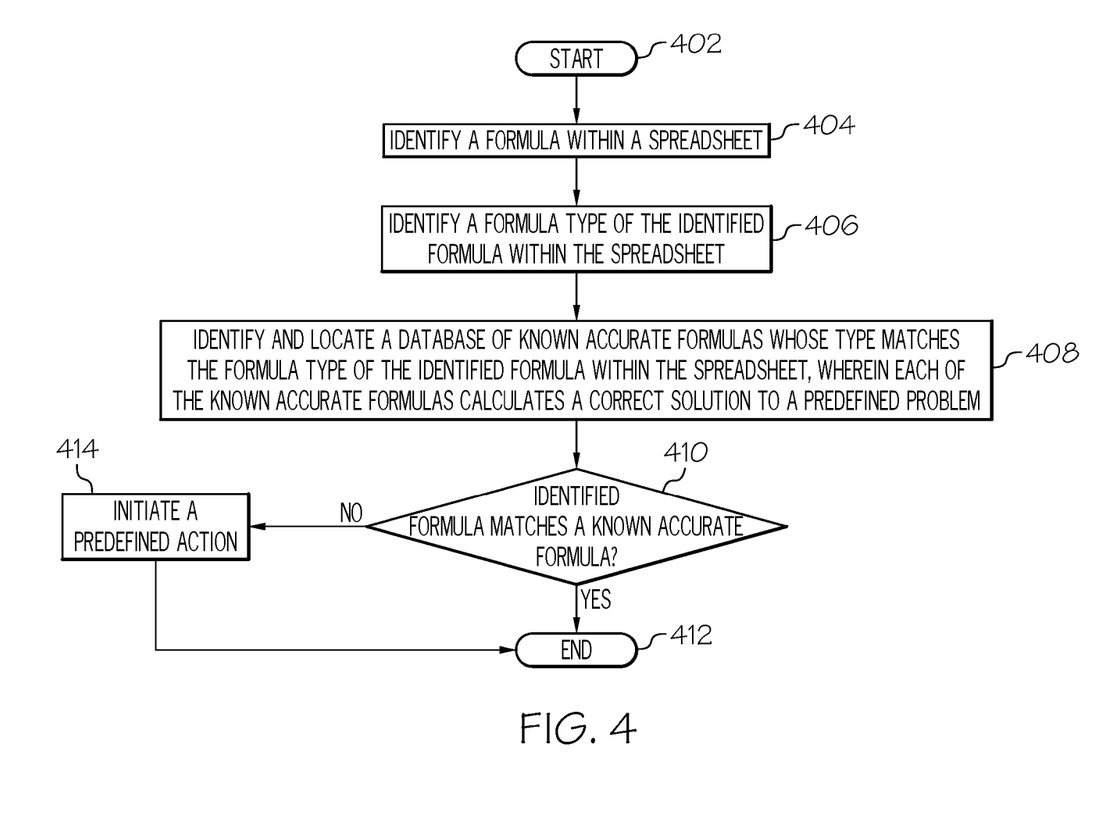
FIG. 4 is a high level flow chart of one or more exemplary steps taken by one or more processors to validate formulas from a spreadsheet by comparison to known valid formulas.

With reference now to FIG. 4, a high level flow chart of one or more exemplary steps taken by one or more processors to validate formulas from a spreadsheet by comparison to known valid formulas is presented. After initiator block 402 (which may be prompted by presenting a spreadsheet to a computer such as computer 102 shown in FIG. 1), one or more processors identifies a formula within that spreadsheet (block 404). As described in block 406, a formula type of an identified formula from the spreadsheet is identified. As described herein, the formula type may be from a heading in the spreadsheet, from syntax and/or measurement units (e.g., $, rads, millibars, etc.) of measurement, from dependencies on other formulas, etc.

As described in block 408, one or more processors then identifies and locates a database of known accurate formulas whose type matches the formula type of the identified formula within the spreadsheet, wherein each of the known accurate formulas calculates a correct solution to a predefined problem. For example, if a formula is determined (identified) to be related to meteorology, then a database of meteorological formulas that are known to be valid (i.e., use the correct syntax, produce accurate results for their intended use, etc.) is located. This process of locating the appropriate database can be through searching databases by their metatags, names, etc., or by creating a database by searching on-line documents for keywords and formulas related to the type of identified formula from the spreadsheet, etc.

As described in query block 410, a determination is then made as to whether the identified formula from the spreadsheet matches a known accurate formula from the database. If so, then the process ends (terminator block 412), since an assumption is made that prior usage of that formula is sufficient evidence of the validity (i.e., accuracy in syntax, structure, and ability to produce a valid/accurate output for the predetermined intended purpose) of that formula. However, if the formula from the spreadsheet is not found (either absolutely or in sufficient quantities or by appropriate entities, as described herein) in the database of known accurate formulas (query block 410), then a predefined action is initiated (block 414). That is, in one embodiment, even though the formula from the spreadsheet 200 is found in the database 300 (see FIGS. 2 and 3), if this formula is not found as enough of the entries (i.e., more than a predefined amount) in the database, or if the entries of the formula come from untrusted and/or poorly weighted sources (e.g., they come from publications that are ranked poorly by professional reviewers), then the formula from the spreadsheet 200 is not validated.

In one embodiment of the present invention, the predefined action represented in block 414 comprises replacing, by one or more processors, the identified formula from the spreadsheet with a replacement known accurate formula from the database. That is, assume in FIG. 3 that formula 204n is not found in the row having header 305 (which describes formula 204n's formula type). In one embodiment, a known valid formula from this row (e.g., formula 312) simply replaces formula 204n in spreadsheet 200, since formula 312 is known to be a valid formula that performs the same function (i.e., is of the same type of formula described by heading 305) as formula 204n.

In one embodiment of the present invention, the predefined action represented in block 414 comprises issuing, by one or more processors, an alert stating that the initially untyped formula is invalid, wherein an invalid formula is unable to calculate the correct solution to the predefined problem. That is, rather than trying to automatically correct or replace the invalid formula, an error message is simply sent to the user/creator of the spreadsheet, alerting her of the anomaly (i.e., the purported erroneous formula in spreadsheet 200).

In one embodiment of the present invention, the predefined action referred to in block 414 comprises adding, by one or more processors, the initially untyped formula to the database. That is, although a formula from the spreadsheet is not found in the appropriate column/row of the database of known valid formulas, it might simply be a new (and maybe better) formula for solving these same types of problems. Thus, this new formula may be automatically added to the database of known valid formulas. In one embodiment, an alert is also issued, notifying the user and/or constructor of the database that this formula has been added to the database. If the user (or alternatively, an evaluation logic) determines that this formula is actually invalid, then it is removed from the database of known valid formulas.

In one embodiment of the present invention, the predefined action represented in block 414 comprises: removing, by one or more processors, the initially untyped formula from the spreadsheet; and creating, by one or more processors, a new spreadsheet that contains the initially untyped formula. That is, assuming that the identified formula from the spreadsheet fails to match the known accurate formula from the database, then that identified formula is removed from the spreadsheet and placed in a new spreadsheet, thus isolating the identified formula from the original spreadsheet. In one embodiment, all of the formulas (valid and perhaps invalid) found in the original spreadsheet populate the new spreadsheet, thus allowing a safe workspace in which to test the effects of the anomalous formula (i.e., the formula from the spreadsheet that couldn't be found in the database of known valid formulas).

In one embodiment of the present invention, identifying the replacement known accurate formula comprises identifying, by one or more processors, a most common formula whose type matches the formula type of the identified formula within the spreadsheet as the replacement known accurate formula, wherein the most common formula occurs more frequently in the database of known accurate formulas that other formulas of the formula type of the identified formula within the spreadsheet. For example and continuing with the example above, formula 312 may replace formula 204n in spreadsheet 200 (see FIG. 2) if formula 312 is the most frequently used formula (of the type identified by heading 305) found in database 300, or if formula 312 comes from the highest-rated source, etc.

In one embodiment of the present invention, an initially untyped formula within the spreadsheet (e.g., those in the column below heading 203 in the spreadsheet 200 in FIG. 2) is typed by determining, by one or more processors, that the initially untyped formula depends on a particular formula having a known type; and assigning, by one or more processors, the known type of the particular formula to the initially untyped formula. For example and as described herein, if formula 204a depends on and/or was derived from formula 202a, then formula 204a is deemed to be of the same type of formula as formula 202a.

In one embodiment of the present invention, an initially untyped formula within the spreadsheet is typed by: associating, by one or more processors, a particular measurement unit with a particular known formula type; determining, by one or more processors, that the initially untyped formula utilizes the particular measurement unit; and assigning, by one or more processors, the particular known formula type to the initially untyped formula. For example and described herein, if an initially untyped formula includes the measurement units "millibars", then that initially untyped formula is now typed with confidence as being related to meteorology.

In one embodiment of the present invention, in response to the identified formula from the spreadsheet matching the known accurate formula from the database, one or more processors generates a notice indicating that the initially untyped formula is valid, wherein a valid formula is able to calculate the correct solution to the predefined problem. That is, the present invention not only detects and/or corrects bad (i.e., having improper syntax, units, etc.) formulas, but also validates those formula that are good (i.e., use the proposer syntax, units, etc.).

In one embodiment of the present invention, identifying the database of known accurate formulas whose type matches the formula type of the identified formula from the spreadsheet comprises matching, by one or more processors, key words within the identified formula from the spreadsheet with metatags used to describe the database of known accurate formulas. For example, assume that a formula in the spreadsheet 200 shown in FIG. 2 used the measurement unit "acres" and/or the term "acreage" as part of the formula. If so, then such key words are matched with metatags (the same or similar—i.e., those found in a lookup table for matching similar terms) that describe the type of formulas found in the database. That is, the database (e.g., database 300 in FIG. 3) will have metatags (not shown) that describe the formulas contained therein, and these metatags are matched to key words found in the formulas within the spreadsheet (e.g., spreadsheet 200 shown in FIG. 2).

In one embodiment of the present invention, a determination is made as to whether the identified formula from the spreadsheet is executable. If not, then the predefined action is initiated. For example, assume that the identified formula in the spreadsheet is:

$$x \text{ lbs} = \sqrt{-20} * 3 \text{ acres}$$

There are two problems with this formula: 1) the units of measurement ("lbs" and "acres") on either side of the equation are unrelated (i.e., there is no logical relationship between weight and land area), and 2) there is no square root of a negative number ($\sqrt{-20}$). Thus, this formula is not executable because 1) it makes no relational sense (pounds (lbs) of weight don't equal area), and 2) it includes a faulty operand (taking the square root of a negative number). One or both of such errors results in the system determining that there is an error with this formula, thus leading to the generation of an alert, replacing the formula with another formula of the same type (assuming that this formula's type has been determined using the methodology described herein or other methodology), etc.

In one embodiment of the present invention, a source of the known accurate formulas in the database is identified, and weighted based on its source. For example, assume that formula types identified by heading 305 in FIG. 3 are for medical procedures. Assume also that formula 312 came from one or more peer-reviewed well-respected medical journals, while formula 314 came from a lifestyle blog and formula 316 came from a local newspaper article. As such, formula 312 is weighted more heavily, since it has been peer-reviewed and published in well-respected medical journals (i.e., journals that have a high level of readership in the healthcare provider community). Being more heavily weighted, formula 312 will be chosen over formulas 314 or 316 when being substituted for a formula (e.g., formula 204*n*) found within spreadsheet 200, when being selected for comparison to formula 204*n*, etc.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer program product for validating a formula within a spreadsheet, the computer program product comprising a computer readable storage medium having program code embodied therewith, the program code readable and executable by a processor to perform a method comprising:
    identifying a formula within a spreadsheet;
    identifying a formula type of an identified formula from the spreadsheet;
    identifying and locating a database of known accurate formulas whose type matches the formula type of the identified formula within the spreadsheet, wherein each of the known accurate formulas calculates a correct solution to a predefined problem;
    determining whether the identified formula from the spreadsheet matches a known accurate formula from the database;
    determining whether the identified formula from the spreadsheet is executable; and
    in response to determining that the identified formula is not executable and in response to the identified formula from the spreadsheet failing to match the known accurate formula from the database, initiating a predefined action.

2. The computer program product of claim 1, wherein the predefined action comprises:
    replacing the identified formula from the spreadsheet with a replacement known accurate formula from the database.

3. The computer program product of claim 2, wherein identifying the replacement known accurate formula comprises:
    identifying a most common formula whose type matches the formula type of the identified formula within the spreadsheet as the replacement known accurate formula, wherein the most common formula occurs more frequently in the database of known accurate formulas than other formulas of the formula type of the identified formula within the spreadsheet.

4. A computer system comprising:
    a processor, a computer readable memory, and a computer readable storage medium;
    first program instructions to identify a formula within a spreadsheet;
    second program instructions to identify a formula type of an identified formula from the spreadsheet;
    third program instructions to identify and locate a database of known accurate formulas whose type matches the formula type of the identified formula within the spreadsheet, wherein each of the known accurate formulas calculates a correct solution to a predefined problem;
    fourth program instructions to determine whether the identified formula from the spreadsheet matches a known accurate formula from the database;
    fifth program instructions to, in response to the identified formula from the spreadsheet failing to match the known accurate formula from the database, initiate a predefined action;
    sixth program instructions to determine that an initially untyped formula within the spreadsheet depends on a particular formula having a known type;
    seventh program instructions to assign the known type of the particular formula to the initially untyped formula; and
    eighth program instructions to add the initially untyped formula to the database;
and wherein
said first, second, third, fourth, fifth, sixth, seventh, and eighth program instructions are stored on said computer readable storage medium, and wherein said program instructions are executed by said processor via said computer readable memory.

5. The computer system of claim 4, further comprising:
    ninth program instructions to replace the identified formula from the spreadsheet with a replacement known accurate formula from the database; and wherein
said ninth program instructions are stored on said computer readable storage medium for execution by said processor via said computer readable memory.

6. The computer system of claim 5, further comprising:
    tenth program instructions to identify a most common formula whose type matches the formula type of the identified formula within the spreadsheet as the replacement known accurate formula, wherein the most common formula occurs more frequently in the database of known accurate formulas than other formulas of the formula type of the identified formula within the spreadsheet; and wherein
said tenth program instructions are stored on said computer readable storage medium for execution by said processor via said computer readable memory.

7. The computer system of claim 4, further comprising:
    ninth program instructions to type an initially untyped formula within the spreadsheet by determining that the initially untyped formula depends on a particular formula having a known type; and
    tenth program instructions to assign the known type of the particular formula to the initially untyped formula; and wherein
said ninth and tenth program instructions are stored on said computer readable storage medium for execution by said processor via said computer readable memory.

8. The computer system of claim 4, further comprising:
    ninth program instructions to type an initially untyped formula within the spreadsheet by associating a particular measurement unit with a particular known formula type;
    tenth program instructions to determine that the initially untyped formula utilizes the particular measurement unit; and
    eleventh program instructions to assign the particular known formula type to the initially untyped formula; and wherein
said ninth, tenth, and eleventh program instructions are stored on said computer readable storage medium for execution by said processor via said computer readable memory.

* * * * *